(12) United States Patent
Vogt

(10) Patent No.: US 12,411,032 B2
(45) Date of Patent: Sep. 9, 2025

(54) ULTRASONIC FLOWMETER AND METHOD FOR DETERMINING THE VELOCITY OF A FLOWING MEDIUM

(71) Applicant: KROHNE Messtechnik GmbH, Duisburg (DE)

(72) Inventor: Michael Vogt, Bochum (DE)

( * ) Notice: Subject to any disclaimer, the term of this patent is extended or adjusted under 35 U.S.C. 154(b) by 346 days.

(21) Appl. No.: 17/652,029

(22) Filed: Feb. 22, 2022

(65) Prior Publication Data

US 2022/0268609 A1 Aug. 25, 2022

(30) Foreign Application Priority Data

Feb. 23, 2021 (DE) ...................... 10 2021 104 288.7

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01); *G01F 1/668* (2013.01)

(58) Field of Classification Search
CPC .......... G01F 1/667; G01F 1/662; G01F 1/668; G01F 1/66; G01P 5/245
See application file for complete search history.

(56) References Cited

U.S. PATENT DOCUMENTS

| | | | |
|---|---|---|---|
| 4,838,127 A | 6/1989 | Herremans et al. | |
| 5,962,790 A | 10/1999 | Lynnworth et al. | |
| 2011/0271769 A1* | 11/2011 | Kippersund | G01F 1/86 |
| | | | 73/861.28 |

FOREIGN PATENT DOCUMENTS

| | | | |
|---|---|---|---|
| DE | 102011119673 A1 | 4/2013 | |
| DE | 102013101950 A1 | 11/2013 | |
| EP | 3564631 A1 * | 11/2019 | ........ G01F 1/66 |
| EP | 3644022 A1 | 4/2020 | |
| WO | 2011078691 A2 | 6/2011 | |

* cited by examiner

*Primary Examiner* — Timothy P Graves
(74) *Attorney, Agent, or Firm* — Patrick D. Duplessis

(57) ABSTRACT

An ultrasonic flowmeter includes at least a first, a second, and a third ultrasonic transducer, and a control and evaluation unit for controlling the ultrasonic transducers and for evaluating measured signals. The flowmeter is configured such that, during operation, the first and second ultrasonic transducers are arranged on a measuring tube offset relative to one another such that a measuring path is present therebetween. The measuring path is defined by the course of the ultrasonic measuring signal during operation. The third ultrasonic transducer is arranged on the measuring tube during operation such that an additional reference path is defined, which includes the course of the Lamb wave emitted by at least one ultrasonic transmitter into the measuring tube wall. The control and evaluation unit determines the velocity of a medium flowing through the measuring tube taking into account the propagation velocity of the Lamb wave in the measuring tube wall.

19 Claims, 4 Drawing Sheets

ULTRASONIC FLOWMETER AND METHOD FOR DETERMINING THE VELOCITY OF A FLOWING MEDIUM

TECHNICAL FIELD

The invention is based on an ultrasonic flowmeter comprising at least a first and a second ultrasonic transducer, wherein the first ultrasonic transducer and the second ultrasonic transducer are each configured as an ultrasonic transmitter and/or an ultrasonic receiver, wherein, during operation, the first ultrasonic transducer and the second ultrasonic transducer are arranged on a measuring tube offset relative to one another in such a way that a measuring path L is provided between the first ultrasonic transducer and the second ultrasonic transducer, wherein the measuring path L is defined by the course of the ultrasonic measuring signal during operation, and further comprising a control and evaluation unit for controlling the ultrasonic transducers and for evaluating the measured signals. Furthermore, the invention relates to a method for determining the velocity of a flowing medium by means of an ultrasonic flowmeter, wherein the ultrasonic flowmeter comprises at least a first ultrasonic transducer and a second ultrasonic transducer, wherein the first ultrasonic transducer and the second ultrasonic transducer are each configured as an ultrasonic transmitter and/or an ultrasonic receiver, wherein the first ultrasonic transducer and the second ultrasonic transducer are arranged on a measuring tube offset relative to one another in such a way that a measuring path L is provided between the first ultrasonic transducer and the second ultrasonic transducer, wherein the measuring path L is defined by the course of the ultrasonic measuring signal during operation, and further comprising a control and evaluation unit for controlling the ultrasonic transducers and for evaluating the measured signals.

BACKGROUND

Various types of ultrasonic flowmeters are known from the prior art. A distinction can be made, for example, between ultrasonic flowmeters in which the ultrasonic transducers for generating or receiving the measuring signal are integrated in the measuring tube wall, so that the ultrasonic signal is emitted directly into the medium to be measured, and ultrasonic flowmeters in which the ultrasonic transducers are arranged on the outside of the measuring tube, so that the ultrasonic signal enters the medium to be measured through the measuring tube wall and also exits again.

In particular, the latter ultrasonic flow measuring systems have the problem that the coupling, in particular the coupling angle, of the generated ultrasonic signal from the measuring tube wall into the measuring tube depends on the parameters of the measuring tube, in particular on the measuring tube material and the thickness of the measuring tube, but also on the parameters of the flowing medium and on the current operating parameters. In addition, part of the signal emitted into the measuring tube wall may also propagate along the measuring tube wall as a Lamb wave.

This is disadvantageous in that, for example, in clamp-on measuring devices where the ultrasonic measuring arrangement is placed on tubes integrated in the measuring environment, the signal path within the measuring tube is not precisely known. This leads to a systematic error underlying the flow measurement.

SUMMARY

Therefore, it is an object of the invention to provide an ultrasonic flowmeter that has increased measurement accuracy. In addition, it is an object of the invention to provide a method for determining the velocity of a flowing medium that exhibits increased measurement accuracy.

According to a first teaching of the present invention, the object set out above is achieved by an ultrasonic flowmeter described at the beginning in that at least a third ultrasonic transducer is provided which, during operation, is arranged on the measuring tube in such a way that it defines an additional reference path $L_0$, wherein the reference path $L_0$ comprises the path of the Lamb wave emitted by at least one ultrasonic transmitter into the measuring tube wall, and that the control and evaluation unit is designed in such a way that, during operation, it determines the velocity of a medium flowing through the measuring tube, taking into account the propagation velocity of the Lamb wave in the measuring tube wall.

According to the invention, it has been recognized that the detection of the propagation of the Lamb wave, which is usually considered to be an interfering wave, can be used to determine the exact entry or exit of the measuring signal into or from the measuring tube, in particular the coupling angle. As a result, the measuring path within the measuring tube on which the determination of the flow velocity is based has a higher accuracy. Furthermore, by knowing the propagation velocity of the Lamb wave in the measuring tube wall, it is also possible to determine a propagation time offset, which is caused in that the measuring signal propagates again along the measuring tube when it hits the measuring tube in the propagation direction in front of the ultrasonic receiver.

Thus, if the propagation velocity of the Lamb wave in the measuring tube wall is determined based on the arrangement of the third ultrasonic transducer according to the invention, the determination of the transit time of the measuring signal and thus the determination of the velocity of the flowing medium can be improved. According to the invention, at least one ultrasonic transducer is therefore aligned in such a way that it specifically excites Lamb waves in the measuring tube wall.

In principle, each ultrasonic transducer can be designed as a wedge transducer or as a comb transducer or as an interdigital transducer. Particularly preferably, at least the first ultrasonic transducer and/or the second ultrasonic transducer is designed as a comb transducer or as an interdigital transducer.

According to one design, the ultrasonic flowmeter is a clamp-on measuring device. In this design, the ultrasonic transducers are placed on a measuring tube integrated into a system. According to an alternative design, the measuring tube is part of the ultrasonic flowmeter. In this case, the measuring tube with the ultrasonic transducers is integrated into a pipe system, for example by means of flanges.

According to a particularly preferred design, the reference path $L_0$ runs spatially separated from the measuring path L within the measuring tube wall, preferably essentially parallel to the measuring tube axis.

According to one design, the third ultrasonic transducer is designed such that it can also function as an ultrasonic transmitter and ultrasonic receiver. Alternatively, the ultrasonic transducer can also be designed as an ultrasonic receiver only.

If the Lamb wave to be captured is emitted by the first ultrasonic transducer during operation, the third ultrasonic transducer for capturing the Lamb wave is preferably offset in the direction of propagation of the measuring signal and arranged at the same height as the first ultrasonic transducer.

Particularly preferably, the distance between the first ultrasonic transducer and the third ultrasonic transducer for capturing the Lamb wave is smaller than the distance between the first ultrasonic transducer and the second ultrasonic transducer for capturing the measuring signal.

For example, the third ultrasonic transducer is located between the first ultrasonic transducer and the second ultrasonic transducer. Particularly preferably, the three ultrasonic transducers are arranged on a straight line that is substantially parallel to the measuring tube axis. According to this design, the measuring path L is preferably V-shaped or W-shaped. Alternatively, the third ultrasonic transducer can also be arranged at the same height as the first ultrasonic transducer, wherein the second ultrasonic transducer is arranged on the opposite side of the measuring tube.

It is also preferred if the reference path $L_0$ is formed independently of the ultrasonic transducers between which the measuring path L runs. For this, the reference path $L_0$ runs between a third and a fourth ultrasonic transducer, wherein the third and the fourth ultrasonic transducer are arranged spatially separated from the first and the second ultrasonic transducer. For example, the third and fourth ultrasonic transducers are arranged on the opposite side of the measuring tube to the first and second ultrasonic transducers.

According to this design, the excitation and the determination of the propagation velocity of the Lamb wave in the measuring tube wall can be carried out in a particularly flexible manner, since it is independent of the emission of a measuring signal by the first or second ultrasonic transducer. Particularly preferably, the determination of the propagation velocity of the Lamb wave can be carried out in dependence on the value of an operating parameter. For this, there is preferably a further sensor that determines at least one process parameter during operation, for example the temperature of the measuring tube. If the value of the process parameter exceeds a tolerance range, the propagation velocity of the Lamb wave is captured again. To ensure that a separate measurement of the Lamb wave takes place under the process parameters on which the flow measurement is based, the third and the fourth ultrasonic transducers are arranged in the measurement vicinity of the first and the second ultrasonic transducer.

According to a next design, at least one ultrasonic transducer is configured as a comb transducer or as an interdigital transducer, such that the at least one ultrasonic transducer configured as a comb transducer or as an interdigital transducer emits a signal during operation that propagates on a first signal path in the direction of flow and on a second signal path against the direction of flow, wherein one signal path corresponds to the measuring path L and wherein preferably the third ultrasonic transducer is arranged on the side of the other signal path.

According to this design, the reference path $L_0$ is spatially separated from the measuring path L, wherein the reference path $L_0$ also runs in the opposite direction to the measuring path L. This design has the advantage that, on the one hand, the reference path $L_0$ and the measuring path L are formed separately from one another and, moreover, the third ultrasonic transducer for capturing the Lamb wave is not arranged within the ultrasonic arrangement for measuring the transit time.

Moreover, it is also advantageous if the first ultrasonic transducer and the second ultrasonic transducer and the third ultrasonic transducer are formed as a comb transducer or an interdigital transducer, and wherein the third ultrasonic transducer is arranged between the first ultrasonic transducer and the second ultrasonic transducer. In this design, the third ultrasonic transducer can capture a Lamb wave both when the first ultrasonic transducer emits a signal into the measuring tube and when the second ultrasonic transducer emits a signal into the measuring tube.

Furthermore, it is particularly advantageous if the length of the reference path $L_0$ is small compared to the length of the measuring path L, preferably the ratio $L_0/L$ is smaller than 0.5 and especially preferably smaller than 0.2 or smaller than 0.1. In detail, the length $L_0$ is preferably so short that the Lamb wave attenuating in the propagation direction can be measured well. The advantage of the invention is particularly apparent in the case of measuring tubes with large diameters, since the systematic error, which is avoided by determining the Lamb wave according to the invention, is particularly high in the case of long measuring paths.

According to a further particularly preferred design, at least the first ultrasonic transducer is designed as a comb transducer or as an interdigital transducer, wherein a second ultrasonic transducer is arranged offset in the direction of flow relative to the first ultrasonic transducer in such a way that a first measuring path L is provided between the ultrasonic transducers, and wherein a further second ultrasonic transducer is arranged offset in the opposite direction to the first ultrasonic transducer in such a way that a second measuring path L is provided between the ultrasonic transducers, so that, during operation, a measuring signal can be emitted simultaneously in and opposite to the direction of flow by the first ultrasonic transducer. According to this design, the third ultrasonic transducer is preferably arranged between the first ultrasonic transducer and a second ultrasonic transducer. This design has the advantage that the transit time measurement of the measuring signals can be carried out particularly quickly, and in particular it can be ensured that the measurement of the transit times in and opposite to the flow direction can be carried out under the same process conditions.

According to a second teaching of the present invention, the object described at the beginning is achieved by a method mentioned at the beginning for determining the velocity of a flowing medium in that at least a third ultrasonic transducer is provided which, during operation, is arranged on the measuring tube in such a way that it defines an additional reference path $L_0$, wherein the reference path $L_0$ comprises the path of the Lamb wave emitted by at least one ultrasonic transmitter into the measuring tube wall, and that the method comprises the following steps:

emitting a first signal by the first ultrasonic transducer, wherein the first signal propagates as a measuring signal along the measuring path L, emitting a Lamb wave propagating along the reference path $L_0$, capturing the Lamb wave by the third ultrasonic transducer and forwarding the received signal to the control and evaluation unit, wherein the control and evaluation unit determines the propagation velocity of the Lamb wave, capturing the measuring signal by the second ultrasonic transducer and forwarding the received signal to the control and evaluation unit, determining the transit time of the measuring signal, taking into account the propagation velocity of the Lamb wave, determining the velocity of the flowing medium.

In the context of the present invention, a first method state comprises the situation that the first ultrasonic transducer emits a measuring signal which is received by the second ultrasonic transducer. The second method state relates to the situation that the second ultrasonic transducer emits a measuring signal that is received by the first ultrasonic transducer. The determination of the velocity of the flowing medium is based on the known principle of forming the transit time difference of a measuring signal that passes through the measuring path L in the flow direction in a first method state and against the flow direction in a second method state.

The ultrasonic flowmeter for carrying out the method according to the invention is preferably designed according to one of the designs described above.

By determining the propagation velocity of the Lamb wave in the measuring tube wall according to the invention, the course of the measuring signal in the measuring tube can be determined with improved accuracy, wherein, as a result, the measurement of the velocity of a flowing medium and thus the accuracy of the flow measurement can be improved.

In detail, when capturing the Lamb wave, the travel time of the Lamb wave is determined for the reference path $L_0$. Based on the known traveled path $L_0$, the velocity of the Lamb wave, i.e. the propagation velocity of the signal in the measuring tube wall, can be determined from the measured transit time.

By means of the correlation:

$$\frac{\sin \theta}{c_M} = \frac{1}{v_{lamb}},$$

where $\Theta$ is the coupling angle of the measuring signal into the measuring tube, where $c_M$ is the speed of sound in the medium and where $v_{lamb}$ is the velocity of the Lamb wave in the measuring tube wall,
the coupling angle of the measuring signal into the measuring tube and thus the exact course of the measuring path in the measuring tube can be determined from the measured velocity of the Lamb wave.

In knowing the exact course of the measuring signal in the measuring tube, a transit time offset can also be determined, which is a result of the measuring signal hitting the measuring tube in the propagation direction before the ultrasonic receiver, so that the measuring signal still propagates along the measuring tube wall before it is captured by the ultrasonic receiver.

The determination of the transit time offset, which is also made possible by knowing the propagation velocity of the Lamb wave in the measuring tube, also improves the accuracy of the transit time measurement of the measuring signal and thus, as a result, the accuracy of the determination of the velocity of the flowing medium.

According to a preferred design of the method, the second ultrasonic transducer emits a measuring signal in a second method state which propagates along the measuring path L in the direction of the first ultrasonic transducer, wherein the measuring signal is received by the first ultrasonic transducer and forwarded to the control and evaluation unit, and wherein the velocity of the flowing medium is determined taking into account the propagation velocity of the Lamb wave measured in the first method state. Since it can be assumed that the velocity of the Lamb wave in the measuring tube wall is constant at least for the duration of a measuring cycle comprising at least a first and a second method state, it is sufficient to capture only the Lamb wave that is excited in a first method state.

Alternatively, another ultrasonic transducer can be arranged on the measuring tube in such a way that the propagation time of the Lamb wave propagating along the measuring tube can also be determined in the second method state, so that the current propagation velocity is measured in each method state and taken into account when determining the propagation time of the measuring signal.

In addition, it is also advantageous if the velocity of the Lamb wave is not determined in each first method state, but, for example, at regular intervals. For example, the measured velocity of a Lamb wave can be used as the basis for evaluating the measuring signals until a change in an operating parameter, in particular a change in the temperature of the measuring tube, is captured.

According to one design, the propagation velocity of the Lamb wave is captured before the ultrasonic flowmeter is put into operation.

According to another design, the propagation velocity of the Lamb wave is determined during each measurement in the first method state.

According to another design, the Lamb wave propagation velocity is captured at regular intervals or when an operating parameter changes.

BRIEF DESCRIPTION OF THE DRAWING

There is now a plurality of possibilities for designing and further developing the ultrasonic flowmeter according to the invention and the method according to the invention. In this regard, reference is made to the following description of preferred embodiments in conjunction with the drawings.

DETAILED DESCRIPTION

Figure 1:
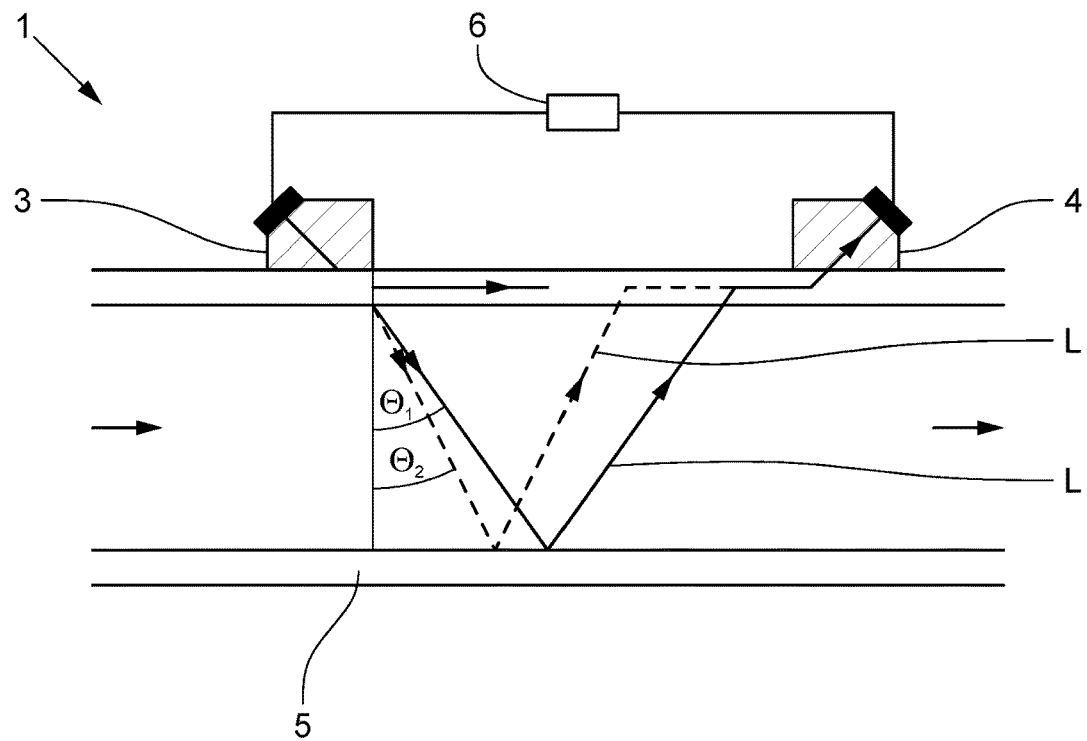
FIG. 1 illustrates an ultrasonic flowmeter from the prior art.

FIG. 1 shows an embodiment of an ultrasonic flowmeter 1 known from the prior art. The ultrasonic flowmeter 1 comprises a first ultrasonic transducer 3, which functions as an ultrasonic transmitter in the illustrated method state, and a second ultrasonic transducer 4, which functions as an ultrasonic receiver in the illustrated method state. The ultrasonic flowmeter 1 shown is designed as a clamp-on measuring device, i.e. the ultrasonic transducers 3, 4 are placed and aligned on a measuring tube 5 integrated in a system. The measuring path L runs between the first ultrasonic transducer 3 and the second ultrasonic transducer 4, wherein the measuring signal emitted by the first ultrasonic transducer 3 propagates along the measuring path L.

In addition, the ultrasonic flowmeter 1 has a control and evaluation unit 6 for controlling the ultrasonic transducers 3, 4 and for evaluating the measured signals.

In the method state shown, the first ultrasonic transducer 3 transmits an ultrasonic signal into the measuring tube 5. For this, the signal first couples into the measuring tube wall.

A part of this signal then couples into the measuring tube at the Rayleigh angle $\Theta$ and propagates along the measuring path L. The Rayleigh angle $\Theta$ is the angle of propagation of the signal. The size of the Rayleigh angle depends, in particular, on the propagation velocity of the generated ultrasonic signal in the measuring tube wall. FIG. 1 shows the coupling at two different angles $\Theta_1$ and $\Theta_2$, which are distinguished by different propagation velocities of the ultrasonic signal in the measuring tube wall. The different coupling angles result in different paths of the measuring signal within the measuring tube 5. It is also shown that the measuring signals hit the measuring tube 5 in the direction of propagation of the measuring signals in front of the ultrasonic receiver 4 and couple into the measuring tube wall again at this point. In this respect, the respective measuring path L is followed by an offset which is the basis of the transit time measurement as a systematic error during operation.

Furthermore, it is shown that another part of the signal coupled into the measuring tube wall by the first ultrasonic transducer 3 propagates along the measuring tube wall as a Lamb wave.

A disadvantage of this embodiment is that the exact course of the measuring signal and thus also the transit time offset is not known, so that, during operation, the transit time measurement of the measuring signal is based on a systematic error.

Figure 2:
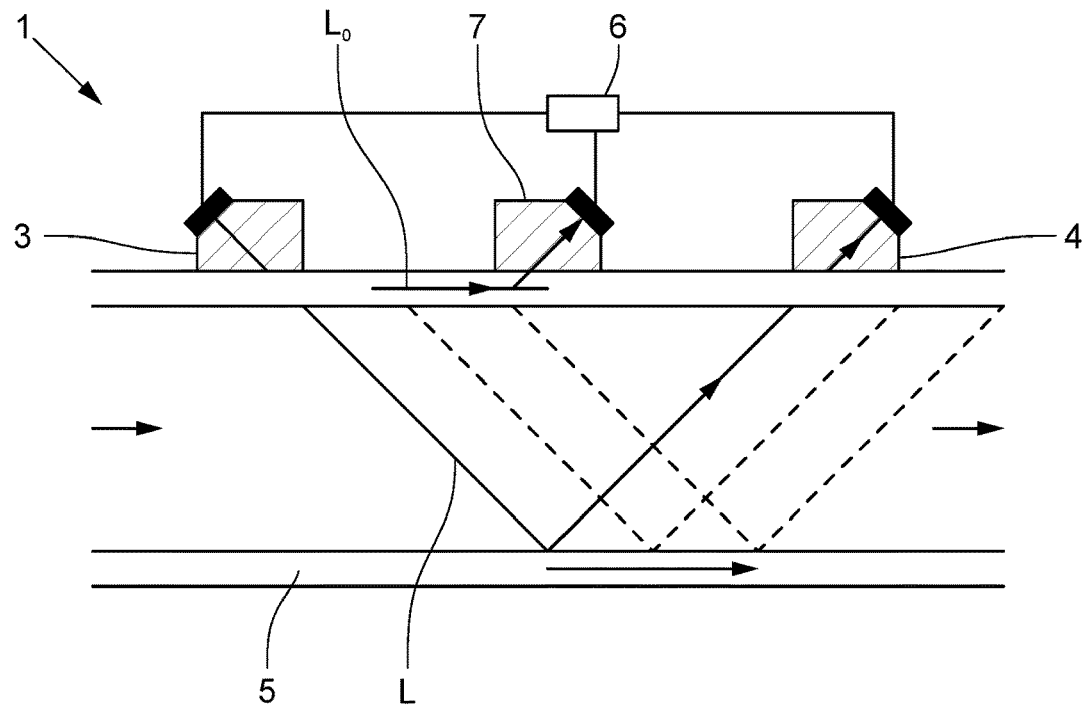
FIG. 2 illustrates a first embodiment of an ultrasonic flowmeter according to the invention.

FIG. 2 shows a first embodiment of an ultrasonic flowmeter 1 according to the invention. The ultrasonic flowmeter 1 shown also has a first ultrasonic transducer 3 and a second ultrasonic transducer 4, wherein a measuring path L is arranged between the first ultrasonic transducer 3 and the second ultrasonic transducer 4, along which the measuring signal propagates between the ultrasonic transducers 3, 4. In addition, a third ultrasonic transducer 7 is provided, which is arranged between the first ultrasonic transducer 3 and the second ultrasonic transducer 4.

The first ultrasonic transducer 3 is aligned in such a way that it specifically excites a Lamb wave in the measuring tube wall by emitting the measuring signal, which wave propagates in the direction of the third ultrasonic transducer.

The third ultrasonic transducer 7 is aligned in such a way that it captures the Lamb wave that is generated by coupling the measuring signal into the measuring tube wall. During operation, the third ultrasonic transducer 7 thus defines a reference path $L_0$. Since the Lamb wave also couples into the measuring tube as a leakage wave, which reduces its amplitude, the length of the reference path $L_0$ is sufficiently small for capturing the Lamb wave.

In addition, the ultrasonic flowmeter 1 has a control and evaluation unit 6 which controls the ultrasonic transducers 3, 4, 7 during operation and further evaluates the measured signals. In detail, the control and evaluation unit 6 determines the transit time of the Lamb wave along the known reference path $L_0$ as well as the propagation velocity of the Lamb wave. From the propagation velocity of the Lamb wave, the control and evaluation unit determines the exact course of the measuring signal in the measuring tube 5. As a result, the velocity of the flowing medium can be determined with improved accuracy.

Figure 3:
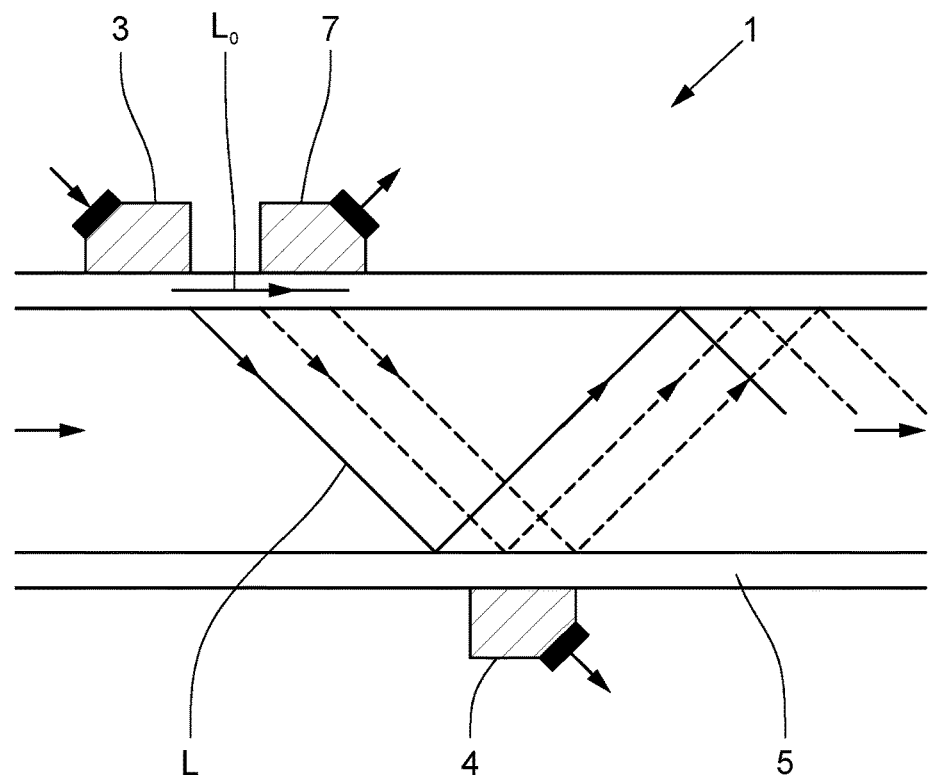
FIG. 3 illustrates a second embodiment of an ultrasonic flowmeter according to the invention.

FIG. 3 shows a further embodiment of an ultrasonic flowmeter 1 according to the invention, comprising a first ultrasonic transducer 3 and a second ultrasonic transducer 4, wherein the measuring path L runs between the first ultrasonic transducer and the second ultrasonic transducer 4. The first and second ultrasonic transducers 3, 4 are arranged on opposite sides on the measuring tube 5. A third ultrasonic transducer 7 is arranged next to the first ultrasonic transducer 3, which captures the Lamb wave during operation, which is coupled into the measuring tube wall with the first measuring signal. The Lamb wave propagates along the measuring tube wall parallel to the measuring tube axis. In addition, it is shown that the Lamb wave also couples into the measuring tube in the course of propagation, which weakens the intensity of the Lamb wave along the propagation direction.

Figure 4:
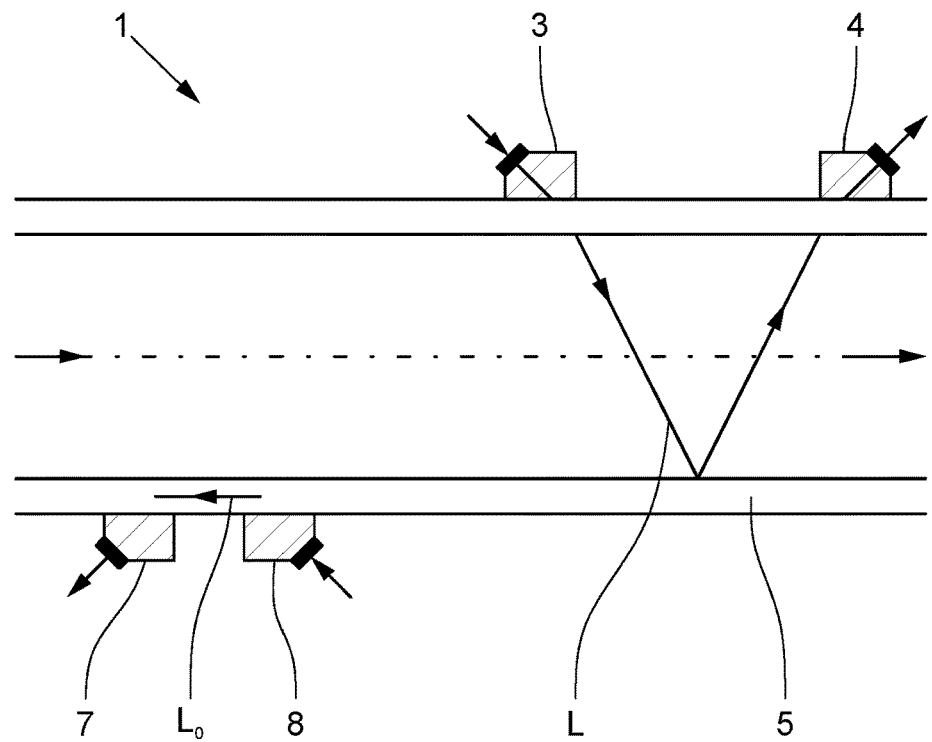
FIG. 4 illustrates a third embodiment of an ultrasonic flowmeter according to the invention.

FIG. 4 shows another embodiment of an ultrasonic flowmeter 1 according to the invention. The ultrasonic flowmeter 1 also has a first ultrasonic transducer 3 and a second ultrasonic transducer 4, between which the measuring path L is formed. In addition, a third ultrasonic transducer 7 and a fourth ultrasonic transducer 8 are provided, wherein the third ultrasonic transducer 7 and the fourth ultrasonic transducer 8 are arranged separately with respect to the arrangement of the first and second ultrasonic transducers 3, 4.

The reference path $L_0$ is implemented between the third ultrasonic transducer 7 and the fourth ultrasonic transducer 8, so that, during operation, the propagation velocity of the measuring signal through the measuring tube wall can also be determined at any time independently of the transmission of a measuring signal for transit time measurement and can be used as the basis for calculating the velocity of the flowing medium. The third ultrasonic transducer 7 and the fourth ultrasonic transducer 8 are arranged in the measuring vicinity of the first and second ultrasonic transducers 3, 4. This ensures that the propagation velocity of the measuring signal in the measuring tube wall is determined under the same process conditions as the transit time measurement.

Figure 5:
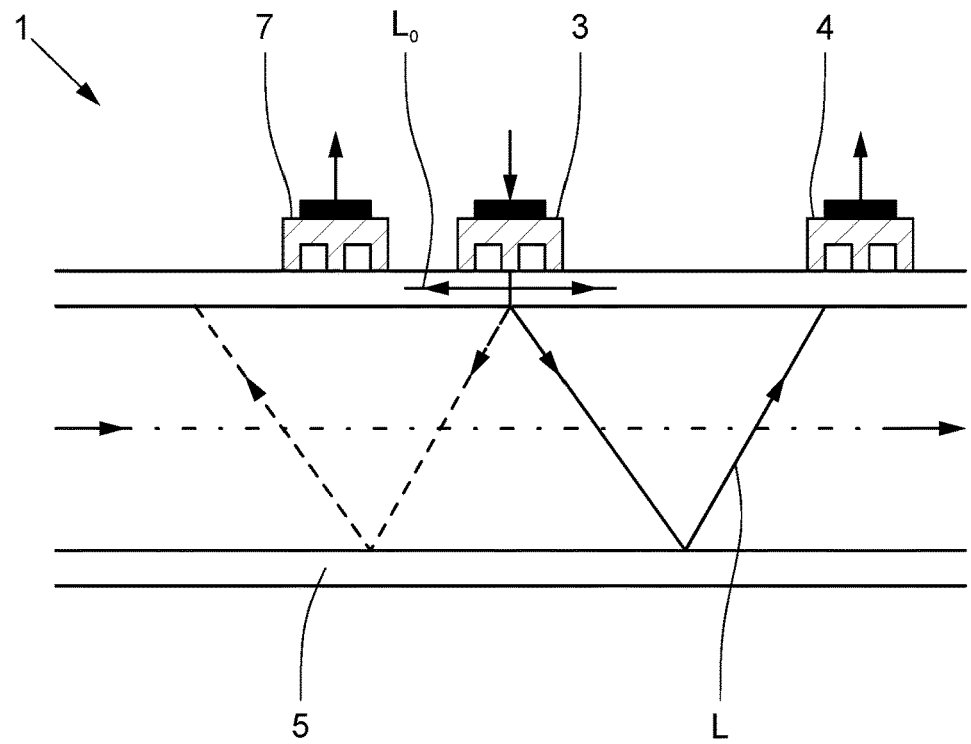
FIG. 5 illustrates a fourth embodiment of an ultrasonic flowmeter according to the invention.

FIG. 5 shows a further embodiment of an ultrasonic flowmeter 1 according to the invention. In contrast to the ultrasonic flowmeters 1 shown above, the first ultrasonic transducer 3 and the second ultrasonic transducer 4 are designed as a comb transducer, so that the measuring signal and thus also the Lamb wave propagating in the measuring tube wall continue both in the flow direction and against the flow direction. In the illustrated embodiment, the third ultrasonic transducer 7 for capturing the Lamb wave propagating in the measuring tube wall is arranged next to the first ultrasonic transducer 4 opposite the direction of propagation of the measuring signal within the measuring tube 5.

Figure 6:
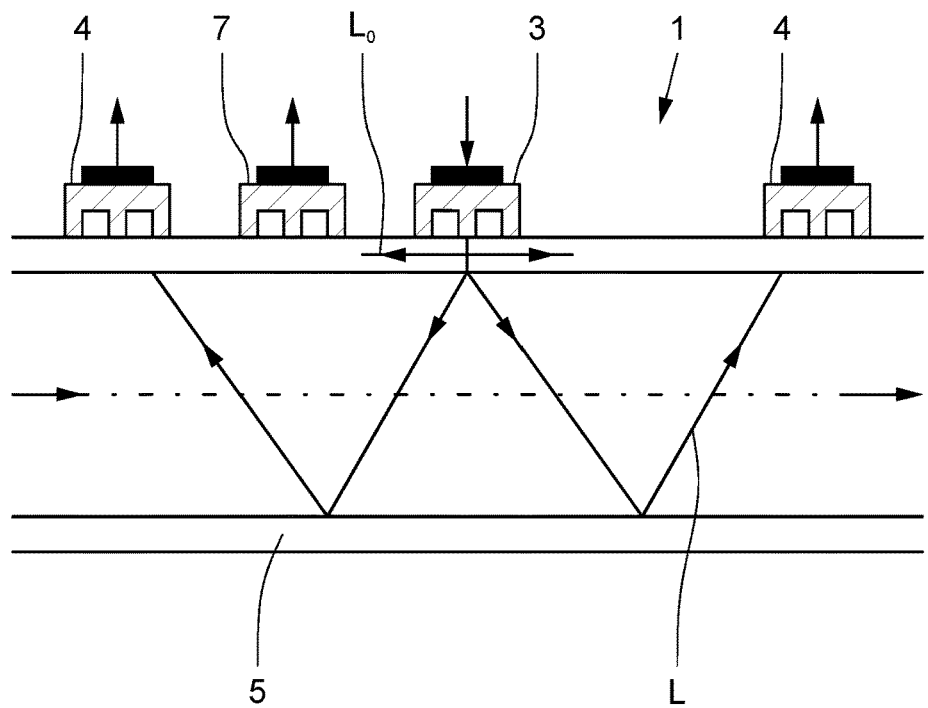
FIG. 6 illustrates a further embodiment of an ultrasonic flowmeter according to the invention.

FIG. 6 shows a next embodiment of an ultrasonic flowmeter 1 according to the invention. The ultrasonic flowmeter 1 comprises a first ultrasonic transducer 3 for emitting a measuring signal and two ultrasonic transducers 4 for receiving the measuring signal. Both the ultrasonic transmitter 3 and the ultrasonic receivers 4 are designed as comb transducers. One ultrasonic transducer 4 is arranged in the direction of flow starting from the ultrasonic transducer 3 formed as a transmitter, the other ultrasonic transducer 4 is arranged in the opposite direction of flow starting from the ultrasonic transducer 3 formed as a transmitter. In addition, a further ultrasonic transducer 7 is provided, which is arranged in such a way that it captures the Lamb wave excited by the emission of the measuring signal.

The arrangement of the ultrasonic transducers 3, 4 shown has the advantage that a measuring signal can be emitted simultaneously in and opposite to the direction of flow, so that the measurement of the transit time of a measuring signal in and opposite to the direction of flow can be carried out simultaneously. This means that the flow velocity can be determined particularly quickly from the transit times of the measuring signals in and opposite to the direction of flow. In particular, this ensures that there is no change in the process parameters between the transit time measurement in the direction of flow and in the opposite direction of flow.

The illustrated arrangement for simultaneous capture of the measuring signal in and opposite to the direction of flow can, of course, also be carried out independently of the capture of the velocity of the Lamb wave. In addition, the ultrasonic transducers 4 can also be designed as wedge transducers or as interdigital transducers.

Figure 7:
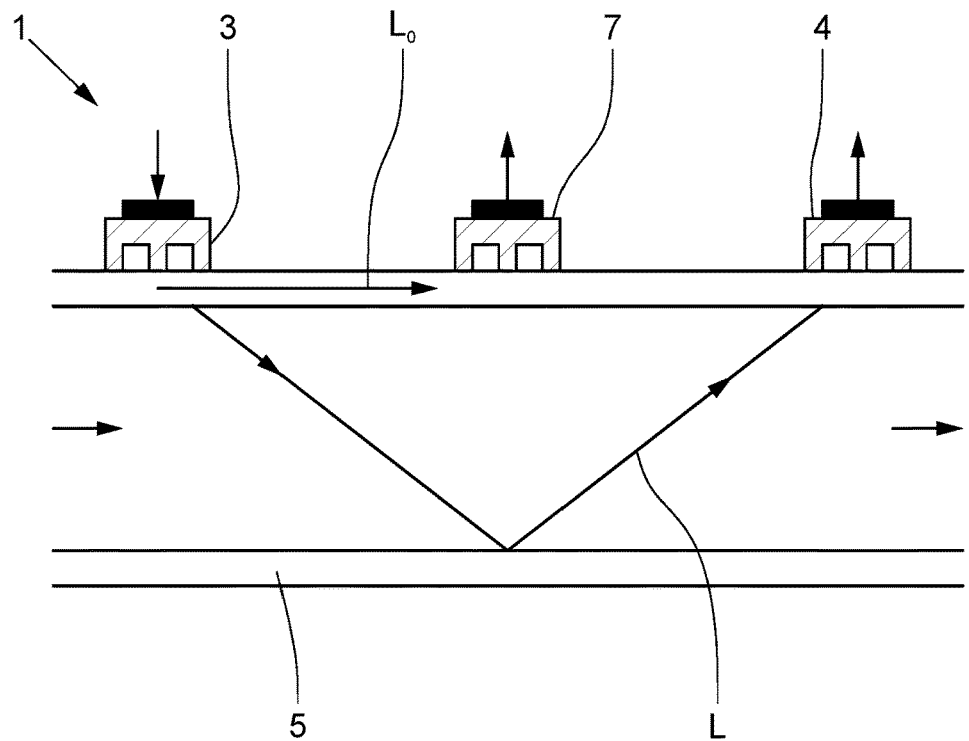
FIG. 7 illustrates a further embodiment of an ultrasonic flowmeter according to the invention.

FIG. 7 shows a next embodiment of an ultrasonic flowmeter 1 according to the invention, wherein all ultrasonic transducers 3, 4, 7 are designed as comb transducers. The third ultrasonic transducer 7 for capturing the Lamb wave is thereby arranged between the first ultrasonic transducer 3 and the second ultrasonic transducer 4. In this embodiment, the ultrasonic transducer 7 can register both the Lamb wave emitted from the first ultrasonic transducer 3 and the Lamb wave emitted from the second ultrasonic transducer 4 when this ultrasonic transducer 4 functions as an ultrasonic transmitter.

Figure 8:
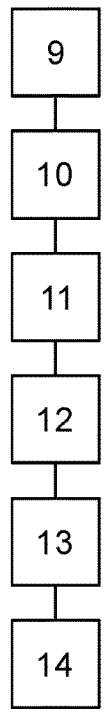
FIG. 8 illustrates a first embodiment of a method according to the invention.

FIG. 8 shows a first embodiment of a method 2 according to the invention for determining the velocity of a flowing medium with an ultrasonic flowmeter 1, wherein the ultrasonic flowmeter 1 is designed according to one of the embodiments in FIGS. 2 to 7.

In a first step 9, the first ultrasonic transducer 3 transmits a first signal, wherein the first signal propagates along the measuring path L as a measuring signal.

At the same time, the first ultrasonic transducer 3 or a further ultrasonic transducer 8 generates a Lamb wave in the measuring tube wall 10, which propagates along the reference path $L_0$.

The Lamb wave is captured by the third ultrasonic transducer 7, 11 and the received signal is forwarded to the control and evaluation unit 6, wherein the control and evaluation unit 6 determines the propagation velocity of the Lamb wave.

The measuring signal is captured by the second ultrasonic transducer 4 and the received signal is forwarded to the control and evaluation unit 6.

Subsequently, the control and evaluation unit 6 determines 13 the propagation time of the measuring signal taking into account the propagation velocity of the Lamb wave.

Finally, the control and evaluation unit 6 determines 14 the velocity of the flowing medium taking into account the measured Lamb wave. Here, the determination of the velocity is based on the transit time difference of a measuring signal propagating in and opposite to the flow direction.

In detail, the control and evaluation unit 6 determines the Rayleigh angle at which the measuring signal is coupled into the measuring tube 5 from the propagation velocity of the Lamb wave in the measuring tube wall. In this way, the distance traveled by the measuring signal within the measuring tube 5 can be determined with particular accuracy. In addition, the control and evaluation unit 6 can also determine a transit time offset of the measuring signal, which results from the measuring signal hitting the measuring tube 5 in the propagation direction in front of the second ultrasonic transducer 4.

As a result, the transit times of the measuring signals through the measuring tube 5 and thus the flow velocity of the medium can be determined particularly accurately.

Depending on the design and arrangement of the ultrasonic transducers 3, 4, 7, 8, the propagation velocity of the Lamb wave in the measuring tube wall can also be captured if the second ultrasonic transducer 4 emits a measuring signal in the reverse direction of propagation along the measuring path L and simultaneously excites a Lamb wave in the measuring tube wall in turn. Alternatively, the propagation velocity of the Lamb wave determined in the first method state can also be used as the basis for evaluating the measured signal in the second method state.

The invention claimed is:

1. An ultrasonic flowmeter, comprising:
a first and a second ultrasonic transducer, each designed as at least one of an ultrasonic transmitter and an ultrasonic receiver, wherein, during operation, the first ultrasonic transducer and the second ultrasonic transducer are arranged on a measuring tube offset relative to one another in such a way that a measuring path L within the measuring tube is present between the first ultrasonic transducer and the second ultrasonic transducer, wherein the measuring path L is defined by a course of an ultrasonic measuring signal travelling through a medium flowing through the measuring tube during operation;
a control and evaluation unit for controlling the first ultrasonic transducer and the second ultrasonic transducer, and for evaluating the ultrasonic measuring signal; and
a third ultrasonic transducer arranged on the measuring tube during operation such that an additional reference path $L_0$ is defined, wherein the additional reference path $L_0$ includes the course of a Lamb wave emitted by the first ultrasonic transmitter into a wall of the measuring tube;
wherein the ultrasonic flowmeter comprises exactly three ultrasonic transducers;
wherein the control and evaluation unit is designed to determine a velocity of the medium flowing through the measuring tube taking into account a propagation velocity of the Lamb wave in the wall of the measuring tube.

2. The ultrasonic flowmeter according to claim 1, wherein the additional reference path $L_0$ runs spatially separated from the measuring path L within the wall of the measuring tube.

3. The ultrasonic flowmeter according to claim 1, wherein the third ultrasonic transducer for detecting the Lamb wave is arranged between the first ultrasonic transducer and the second ultrasonic transducer.

4. The ultrasonic flowmeter according to claim 1, wherein at least one ultrasonic transducer is designed as a comb transducer or as an interdigital transducer, so that the at least one ultrasonic transducer emits a signal during operation which propagates on a first signal path in a direction of flow and on a second signal path against the direction of flow;
wherein one signal path corresponds to the measuring path L; and
wherein the third ultrasonic transducer is arranged on the side of the other signal path.

5. A method for determining a velocity of a flowing medium by means of an ultrasonic flowmeter, wherein the ultrasonic flowmeter includes a first ultrasonic transducer and a second ultrasonic transducer, wherein the first ultrasonic transducer and the second ultrasonic transducer are each configured as an ultrasonic transmitter and/or ultrasonic receiver, wherein the first ultrasonic transducer and the second ultrasonic transducer are arranged on a measuring tube offset relative to one another in such a way that a measuring path L is provided between the first ultrasonic transducer and the second ultrasonic transducer, wherein the measuring path L is defined by a course of an ultrasonic measuring signal travelling through the flowing medium during operation, wherein the ultrasonic flowmeter further includes a control and evaluation unit for controlling the first ultrasonic transducer and the second ultrasonic transducer, and for evaluating the ultrasonic measuring signal, wherein a third ultrasonic transducer is provided which, during operation, is arranged on the measuring tube such that an additional reference path Lois defined, wherein the additional reference path $L_0$ includes a course of a Lamb wave emitted by at least one ultrasonic transmitter into a wall of the measuring tube, wherein the ultrasonic flowmeter comprises exactly three ultrasonic transducers and wherein the method comprises the following steps:

emitting a first signal by the first ultrasonic transducer into the measuring tube travelling through the flowing medium, wherein the first signal propagates as a measuring signal along the measuring path L;

emitting the Lamb wave propagating along the additional reference path $L_0$ by the first ultrasonic transducer;

detecting the Lamb wave by the third ultrasonic transducer and forwarding a received signal to the control and evaluation unit, wherein the control and evaluation unit determines a propagation velocity of the Lamb wave;

detecting the measuring signal by the second ultrasonic transducer and forwarding the received signal to the control and evaluation unit;

determining a transit time of the measuring signal, taking into account the velocity of propagation of the Lamb wave; and determining the velocity of the flowing medium.

6. The method according to claim 5, wherein, in a second method state, the second ultrasonic transducer emits a measuring signal which propagates along the measuring path L in a direction of the first ultrasonic transducer;

wherein the measuring signal is received by the first ultrasonic transducer and is forwarded to the control and evaluation unit; and wherein the velocity of the flowing medium is determined taking into account the propagation velocity of the Lamb wave measured in a first method state.

7. The method according to claim 5, wherein the propagation velocity of the Lamb wave is detected before the ultrasonic flowmeter is operated to determine the velocity of the flowing medium.

8. The method according to claim 5, wherein the propagation velocity of the Lamb wave is determined during each measurement in a first method state.

9. The method according to claim 5, wherein the propagation velocity of the Lamb wave is detected at regular intervals or when an operating parameter changes.

10. The ultrasonic flowmeter according to claim 1, wherein the additional reference path $L_0$ comprises the course of the Lamb wave emitted by the first ultrasonic transmitter into the wall of the measuring tube.

11. An ultrasonic flowmeter, comprising:

at least a first ultrasonic transducer and a second ultrasonic transducer, each designed as at least one of an ultrasonic transmitter and an ultrasonic receiver, wherein, during operation, the first ultrasonic transducer and the second ultrasonic transducer are arranged on a measuring tube offset relative to one another in such a way that a measuring path L is present between the first ultrasonic transducer and the second ultrasonic transducer, wherein the measuring path L is defined by a course of an ultrasonic measuring signal during operation;

a control and evaluation unit for controlling the first ultrasonic transducer and the second ultrasonic transducer, and for evaluating the ultrasonic measuring signal; and at least a third ultrasonic transducer arranged on the measuring tube during operation such that an additional reference path $L_0$ is defined, wherein the additional reference path $L_0$ includes the course of a Lamb wave emitted by at least one ultrasonic transmitter into a wall of the measuring tube;

wherein the control and evaluation unit is designed to determine a velocity of a medium flowing through the measuring tube taking into account a propagation velocity of the Lamb wave in the wall of the measuring tube; and wherein a ratio $L_0/L$ is less than 0.5.

12. The ultrasonic flowmeter according to claim 11, wherein the additional reference path $L_0$ runs spatially separated from the measuring path L within the wall of the measuring tube.

13. The ultrasonic flowmeter according to claim 11, wherein the third ultrasonic transducer for detecting the Lamb wave is arranged between the first ultrasonic transducer and the second ultrasonic transducer.

14. The ultrasonic flowmeter according to claim 11, wherein at least one ultrasonic transducer is designed as a comb transducer or as an interdigital transducer, so that the at least one ultrasonic transducer emits a signal during operation which propagates on a first signal path in a direction of flow and on a second signal path against the direction of flow;

wherein one signal path corresponds to the measuring path L; and wherein the third ultrasonic transducer is arranged on the side of the other signal path.

15. The ultrasonic flowmeter according to claim 11, wherein the additional reference path $L_0$ comprises the course of the Lamb wave emitted by the first ultrasonic transmitter into the wall of the measuring tube.

16. An ultrasonic flowmeter, comprising:

at least a first and a second ultrasonic transducer, each designed as at least one of an ultrasonic transmitter and an ultrasonic receiver, wherein, during operation, the first ultrasonic transducer and the second ultrasonic transducer are arranged on a measuring tube offset relative to one another in such a way that a measuring path L is present between the first ultrasonic transducer and the second ultrasonic transducer, wherein the measuring path L is defined by a course of an ultrasonic measuring signal during operation;

a control and evaluation unit for controlling the first ultrasonic transducer and the second ultrasonic transducer, and for evaluating the ultrasonic measuring signal; and at least a third ultrasonic transducer arranged on the measuring tube during operation such that an additional reference path $L_0$ is defined, wherein the additional reference path $L_0$ includes the course of a Lamb wave emitted by at least one ultrasonic transmitter into a wall of the measuring tube;

wherein the control and evaluation unit is designed to determine a velocity of a medium flowing through the measuring tube taking into account a propagation velocity of the Lamb wave in the wall of the measuring tube;

wherein at least the first ultrasonic transducer is designed as a comb transducer or as an interdigital transducer;

wherein the second ultrasonic transducer is arranged offset in a flow direction with respect to the first ultrasonic transducer in such a manner that a first measuring path L is provided between the first ultrasonic transducer and the second ultrasonic transducer; and wherein a fourth ultrasonic transducer is arranged offset from the first ultrasonic transducer in a direction opposite the flow direction in such a way that a third measuring path is provided between the fourth ultrasonic transducer and the first ultrasonic transducer, wherein during operation, the first ultrasonic transducer emits simultaneously a first measuring signal in the flow direction that is received by the second ultrasonic transducer and a second measuring signal in a direction opposite the flow direction that is received by the fourth ultrasonic transducer.

17. The ultrasonic flowmeter according to claim 16, wherein the additional reference path $L_0$ runs spatially separated from the measuring path L within the wall of the measuring tube.

18. The ultrasonic flowmeter according to claim 16, wherein the third ultrasonic transducer for detecting the Lamb wave is arranged between the first ultrasonic transducer and the second ultrasonic transducer.

19. The ultrasonic flowmeter according to claim 16, wherein the additional reference path $L_0$ comprises the course of the Lamb wave emitted by the first ultrasonic transmitter into the wall of the measuring tube.

* * * * *